United States Patent
Ahn et al.

(10) Patent No.: US 9,735,925 B2
(45) Date of Patent: Aug. 15, 2017

(54) SECURE COMMUNICATION METHOD AND SYSTEM BASED ON BIT ERROR PROBABILITY

(71) Applicant: LG ELECTRONICS INC., Seoul (KR)

(72) Inventors: Joonkui Ahn, Seoul (KR); Ilmin Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 14/820,457

(22) Filed: Aug. 6, 2015

(65) Prior Publication Data

US 2016/0043832 A1    Feb. 11, 2016

Related U.S. Application Data

(60) Provisional application No. 62/035,499, filed on Aug. 10, 2014.

(51) Int. Cl.
*H04L 1/18* (2006.01)
*H04L 1/08* (2006.01)
*H04L 1/20* (2006.01)

(52) U.S. Cl.
CPC ........... *H04L 1/08* (2013.01); *H04L 1/1812* (2013.01); *H04L 1/1896* (2013.01); *H04L 1/203* (2013.01)

(58) Field of Classification Search
None
See application file for complete search history.

(56) References Cited

U.S. PATENT DOCUMENTS

| | | | | |
|---|---|---|---|---|
| 8,514,797 B2 * | 8/2013 | Corral | ................... | H04L 1/0003 370/329 |
| 2002/0004379 A1 * | 1/2002 | Gruhl | .................. | H04L 12/5695 455/403 |
| 2002/0053062 A1 * | 5/2002 | Szymanski | ........... | H03M 13/09 714/801 |
| 2003/0219034 A1 * | 11/2003 | Lotter | ................. | H04L 41/0823 370/469 |
| 2010/0331037 A1 * | 12/2010 | Jen | ....................... | H04W 52/146 455/522 |
| 2011/0145674 A1 * | 6/2011 | Gao | ....................... | H04L 1/0009 714/752 |
| 2011/0286391 A1 * | 11/2011 | Chen | ................... | H04W 52/265 370/328 |

(Continued)

*Primary Examiner* — Daniel McMahon
(74) *Attorney, Agent, or Firm* — Lee, Hong, Degerman, Kang & Waimey

(57) ABSTRACT

Provided is a method for performing Hybrid Automatic Repeat Request (HARQ) by a data transmitting terminal in a wireless communication system. The terminal transmits data using a specific code word selected from a plurality of code words included in a mother code, calculates a Bit Error Rate (BER) upper bound for a receiving terminal that receives the data, calculates a BER lower bound for another terminal that is able to eavesdrop the data, and performs the HARQ based on whether the BER upper bound is greater than a BER reference level for the receiving terminal and whether a probability of the BER lower bound being less than the BER reference level for the another terminal is less than a predetermined value.

12 Claims, 7 Drawing Sheets

(56) References Cited

U.S. PATENT DOCUMENTS

2012/0210187 A1\* 8/2012 Yin ................... H03M 13/136
 714/751
2014/0206414 A1\* 7/2014 Oh ...................... H04B 7/0404
 455/562.1

\* cited by examiner

Original code : L=2, L$_0$=1, R=0.5, N=4, Q=1
No interleaving : [2, 1, 1] voer GF ($2^4$) = $2 \leq 2^4+1=17$ codeword 1 | block 1 | block 2 | block 3 | block 4 | codeword 2 | block 5 | block 6 | codeword 3 | block 7 | block 8 | codeword 4

Interleaving of depth z=2:[4, 2, 2] over GF ($2^2$) = $4 \leq 2^4+1=5$

Interleaving of depth z=4:[8, 4, 4] over GF (2) = $8 \nleq 2+1=3$

SECURE COMMUNICATION METHOD AND SYSTEM BASED ON BIT ERROR PROBABILITY

CROSS-REFERENCE TO RELATED APPLICATIONS

Pursuant to 35 U.S.C. §119(e), this application claims the benefit of U.S. Provisional Patent Application No. 62/035,499, filed on Aug. 10, 2014, the contents of which are all hereby incorporated by reference herein in their entirety.

BACKGROUND OF THE INVENTION

Field of the Invention

The present invention relates to a secure communication method and system based on a bit error probability.

Related Art

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors). A terminal (user equipment, UE) 10 may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like. The base station 20 generally represents a fixed station that communicates with the terminal 10, and may be called different terms such as an evolved-NodeB (eNB), a base transceiver system (BTS), an access point, and the like.

The terminal generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Meanwhile, in a wireless communication system, it is very important to transmit the data from a transmitter (Alice) only to a desired user (Bob) in a safe way while preventing a different user (Eve) from eavesdropping the data.

The most conventional way of transmitting data safely is using a secret key.

However, distribution and management of the secret key may be very complicated, so it may not be suitable for various substantial wireless communication systems.

Recently, a totally new secure transmission method has drawn attention, which is so called physical layer security. It seeks physical layer security in a communication system by using various coding schemes or communication/signal processing theories. Physical layer security has been discussed in "R. Liu and W. Trappe, Securing wireless communications at the physical layer, Springer, 2010."

If data is securely transmitted by Alice to Bob, it may bear various meanings. In view of data security in cryptography, Bob can decode data transmitted by Alice with relatively less computation, but, when Eve tries to decode the same data, a significantly great amount of computation is required and thus decoding is almost impossible. This kind of security is based on computation. If a great amount of computation is required for Eve, it is safe to say the system is secure enough.

However, to this end, complicated distribution and management of a secret key have to be done.

SUMMARY OF THE INVENTION

The present invention is designed to solve the above problem, and provides a communication system that securely transmits data using coding.

Transmitted data is decoded with less errors only by a desired recipient, but a decoding bit error probability for a third party is close to 50% and thus any valid data is not substantially decoded by the third party.

The security communication method may be applied to various wireless channels. In particular, using a Maximal Distance Separable (MDS) code with the most optimal error correction performance in terms of a given code length and a transmission rate, the proposed communication system may be realized.

According to the present disclosure, a secret key is not necessary, unlike the existing cryptography.

In addition, according to a data transmission method according to a method proposed by the present invention, a desired receiver may decode transmitted data at a bit error probability being close to 0, while an undesired receiver may decode the transmitted data at a bit error probability being close to 0.5, That is, the undesired receiver may not obtain meaningful data. In particular, unlike the existing cryptography, a method proposed by the present invention enables data to be transmitted securely when a transmitter and a desired receiver do not have a secret key in advance.

The method proposed by the present invention operates in various substantial channels. In addition, data communication security may be achieved using an MDS code that provides an optimal error correction performance when a code length and a transmission rate is given.

The present invention aims to develop a communication method develop a communication method which causes a bit error probability for Bob to be close to 0 and a bit error probability for Eve close to 0.5 in the case where a code length n is limited.

Specifically, the present invention considers the following:

- not only Gaussian input channel, but a discrete input channel
- not only a quasi-static fading channel, but a more realistic block fading channel
- not only a random coding-based coding, but a coding scheme which allows easy decoding To achieve the above objective, the present invention proposes a method for performing Hybrid Automatic Repeat Request (HARQ) by a data transmitting terminal in a wireless communication system, the method including: transmitting data using a specific code word selected from among a plurality of code words included in a mother code; calculating a Bit Error Rate (BER) upper bound for a receiving terminal, which receives the data, and a BER lower bound for a third terminal that is possibly able to eavesdrop the data; and performing the HARQ based on whether the BER upper bound is greater than a BER reference level for the receiving terminal and whether a probability of the BER lower bound to be smaller than a BER reference level for the third terminal is smaller than a predetermined value, wherein the BER upper bound is determined based on a transmission rate corresponding to the mother code and channel information regarding the receiving terminal, and wherein the BER lower bound is determined based on the transmission rate and channel information regarding the third terminal.

The performing of the HARQ may include determining that transmission of the data is successful in a case where the BER upper bound is smaller than the BER reference level for the receiving terminal and the probability of the BER lower bound to be smaller than the BER reference level for the third terminal is smaller than the predetermined value.

The performing of the HARQ includes determining that transmission of the data is not successful in a case where the BER upper bound is greater than the BER reference level for the receiving terminal and the probability of the BER lower bound to be smaller than the BER reference level for the third terminal is greater than the predetermined value.

The performing of the HARQ includes retransmitting the data in a case where the BER upper bound is greater than the BER reference level for the receiving terminal and the probability of the BER lower bound to be smaller than the BER reference level for the third terminal is smaller than the predetermined value.

In addition, to achieve the above objective, the present invention proposes a method for performing Hybrid Automatic Repeat Request (HARQ) by a data transmitting terminal in a wireless communication system, the method including: transmitting data using a specific code word from among a plurality of code words included in a mother code; receiving an ACK/NACK message from a receiving terminal which receives the data; calculating a Bit Error Rate (BER) lower bound for a third terminal that is possibly able to eavesdrop the data; and performing the HARQ based on whether the ACK/NACK message is an ACK message or an NACK message and whether a probability of the BER lower bound to be smaller than a BER reference level for the third terminal is smaller than a predetermined value, wherein the BER lower bound is determined based on a transmission rate corresponding to the mother code and channel information regarding the third terminal.

The performing of the HARQ includes determining that transmission of the data is successful in a case where the ACK/NACK message is an ACK message and the probability of the BER lower bound to be smaller than the BER reference level for the third terminal is smaller than the predetermined value.

The performing o the HARQ includes determining that transmission of the data is not successful and stopping the transmission in a case where the ACK/NACK message is a NACK message and the probability of the BER lower bound to be smaller than the BER reference level for the third terminal is greater than the predetermined value.

The performing of the HARQ includes retransmitting the data in a case where the ACK/NACK message is a NACK message and the probability of the BER lower bound to be smaller than the BER reference level for the third terminal is smaller than the predetermined value.

Furthermore, to achieve the above objective, the present invention proposes a data transmitting terminal in a wireless communication system, including an RF unit configured to transmit data using a specific code word selected from among a plurality of code words included in a mother code; and a processor configured to calculate a Bit Error Rate (BER) upper bound for a receiving terminal, which receives the data, and a BER lower bound for a third terminal, which is able to eavesdrop the data, and perform Hybrid Automatic Repeat Request (HARQ) based on at least one of whether an ACK/NACK message is an ACK message or a NACK message, whether the BER upper bound is smaller than a BER reference level for the receiving terminal, and whether a probability of the BER lower bound to be smaller than a BER reference level for the third terminal is smaller than a predetermined value, wherein the BER upper bound is determined based on a transmission rate corresponding to the mother code and channel information regarding the receiving terminal, and wherein the BER lower bound is determined based on the transmission rate and channel information regarding the third terminal.

The processor may determine that transmission of the data is successful in a case where the BER upper bound is smaller than the BER reference level for the receiving terminal and the probability of the BER lower bound to be smaller than the BER reference level for the third terminal is smaller than the predetermined value, or where the ACK/NACK message is an ACK message and the probability of the BER lower bound to be smaller than the BER reference level for the third terminal is smaller than the predetermined value.

The processor determines that transmission of the data is not successful and stops the transmission in a case where the BER upper bound is greater than the BER reference level for the receiving terminal and the probability of the BER lower bound to be smaller than the BER reference level for the third terminal is greater than the predetermined value, or where the ACK/NACK message is a NACK message and the probability of the BER lower bound to be smaller than the BER reference level for the third terminal is greater than the predetermined value.

The processor may retransmit the data in a case where the BER upper bound is greater than the BER reference level for the receiving terminal and the probability of the BER lower bound to be smaller than the BER reference level for the third terminal is smaller than the predetermined value, or where the ACK/NACK message is a NACK message and the probability of the BER lower bound to be smaller than the BER reference level for the third terminal is smaller than the predetermined value.

DESCRIPTION OF EXEMPLARY EMBODIMENTS

Figure 1:
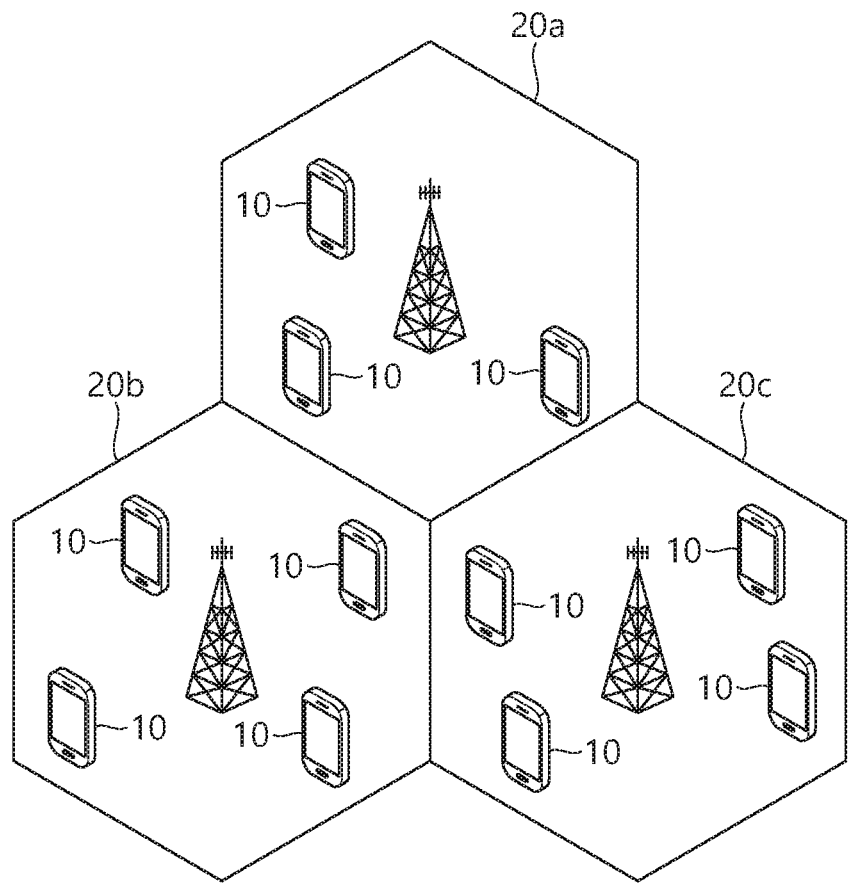
FIG. 1 is view of an evolved mobile communication network.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed there between. On the contrary, in case where an element is "directly connected" or "directly linked" to another element, it should be understood that any other element is not existed there between.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary terminal in accompanying drawings, however the terminal may be referred to as terms such as a user equipment (UE), a mobile equipment (ME), a mobile station (MS), a user terminal (UT), a subscriber station (SS), a wireless device (WD), a handheld device (HD), an access terminal (AT), and etc. And, the terminal may be implemented as a portable device such as a notebook, a mobile phone, a PDA, a smart phone, a multimedia device, etc., or as an unportable device such as a PC or a vehicle-mounted device.

The 3GPP LTE uses an orthogonal frequency division multiple access (OFDMI) in a downlink and a single carrier-frequency division multiple access (SC-FDMI) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

Figure 2:
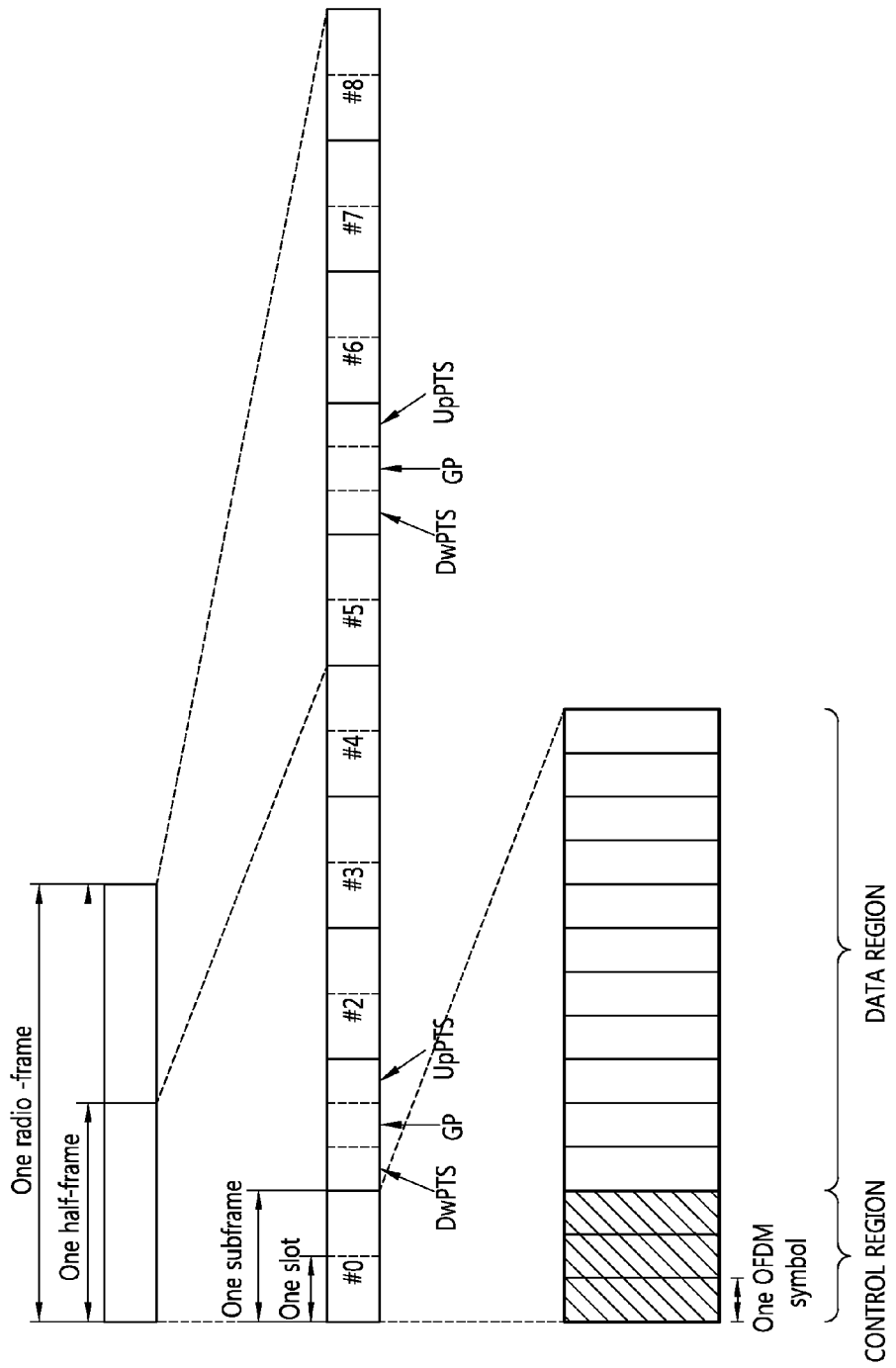
FIG. 2 shows a downlink radio frame structure in 3rd generation partnership project (3GPP) long term evolution (LTE).

FIG. 2 shows a downlink radio frame structure in 3rd generation partnership project (3GPP) long term evolution (LTE). The section 6 of 3GPP TS 36.211 V8.7.0 (2009-05) "Evolved Universal Terrestrial Radio Access (E-UTRI); Physical Channels and Modulation (Release 8)" may be incorporated herein.

As shown in FIG. 1, a radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMI) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMI) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RII) is a resource allocation unit, and includes a plurality of subcarriers in one slot. For example, if one slot includes 7 OFDM symbols in a time domain and the RB includes 12 subcarriers in a frequency domain, one RB can include 7 12 resource elements (REs).

A DL subframe is divided into a control region and a data region in the time domain. The control region includes up to first three OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH is transmitted by using a fixed PCFICH resource of the subframe, without having to perform blind decoding.

The PHICH carries a positive-acknowledgement (ACK)/negative-acknowledgement (NACK) signal for an uplink hybrid automatic repeat request (HARQ). The ACK/NACK signal for UL data on a PUSCH transmitted by the UE is transmitted on the PHICH.

A physical broadcast channel (PBCH) is transmitted in first four OFDM symbols in a 2nd slot of a 1st subframe of a radio frame. The PBCH carries system information necessary for communication between the UE and the BS. The system information transmitted through the PBCH is referred to as a master information block (MIII). In comparison thereto, system information transmitted on the PDCCH indicated by the PDCCH is referred to as a system information block (SIII).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of the available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a UE having a good DL channel state can use one CCE in PDCCH transmission. A UE having a poor DL channel state can use 8 CCEs in PDCCH transmission.

A control channel consisting of one or more CCEs performs interleaving in an REG unit, and is mapped to a physical resource after performing cyclic shift based on a cell identifier (ID).

Now, maintaining of a UL time alignment in 3GPP LTE will be described.

To decrease an interference caused by UL transmission between UEs, it is important for a BS to maintain a UL time alignment of the UEs. The UE may be located in any area in a cell. A UL signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease the interference between the UEs, the BS needs to perform scheduling so that UL signals transmitted by the UEs in the cell can be received every time within a boundary. The BS has to properly adjust transmission timing of each UE according to a situation of each UE. Such an adjustment is called a time alignment maintenance.

A random access procedure is one of methods for managing the time alignment. The UE transmits a random access preamble to the BS. The BS calculates a time alignment value for advancing or delaying transmission timing of the UE on the basis of the received random access preamble. In addition, the BS transmits a random access response including the calculated time alignment value to the UE. The UE updates the transmission timing by using the time alignment value.

In another method, the BS receives a sounding reference signal from the UE periodically or randomly, calculates the time alignment value of the UE by using the sounding reference signal, and reports a MAC control element (CE) to the UE.

The time alignment value is information sent by the BS to the UE to maintain uplink time alignment. A timing alignment command indicates this information.

Since the UE has mobility in general, the transmission timing of the UE varies depending on a moving speed, a location, or the like of the UE. Therefore, the time alignment value received by the UE is preferably valid during a specific time period. For this, a time alignment timer is used.

When the time alignment is updated after receiving the time alignment value from the BS, the UE starts or restarts the time alignment timer. The UE can perform UL transmission only when the time alignment timer is running. A value of the time alignment timer may be reported by the BS to the UE by using system information or an RRC message such as a radio bearer reconfiguration message.

When the time alignment timer expires or when the time alignment timer does not run, the UE does not transmit any uplink signal except for the random access preamble under the assumption that time alignment is not achieved between the BS and the UE.

Figure 3:
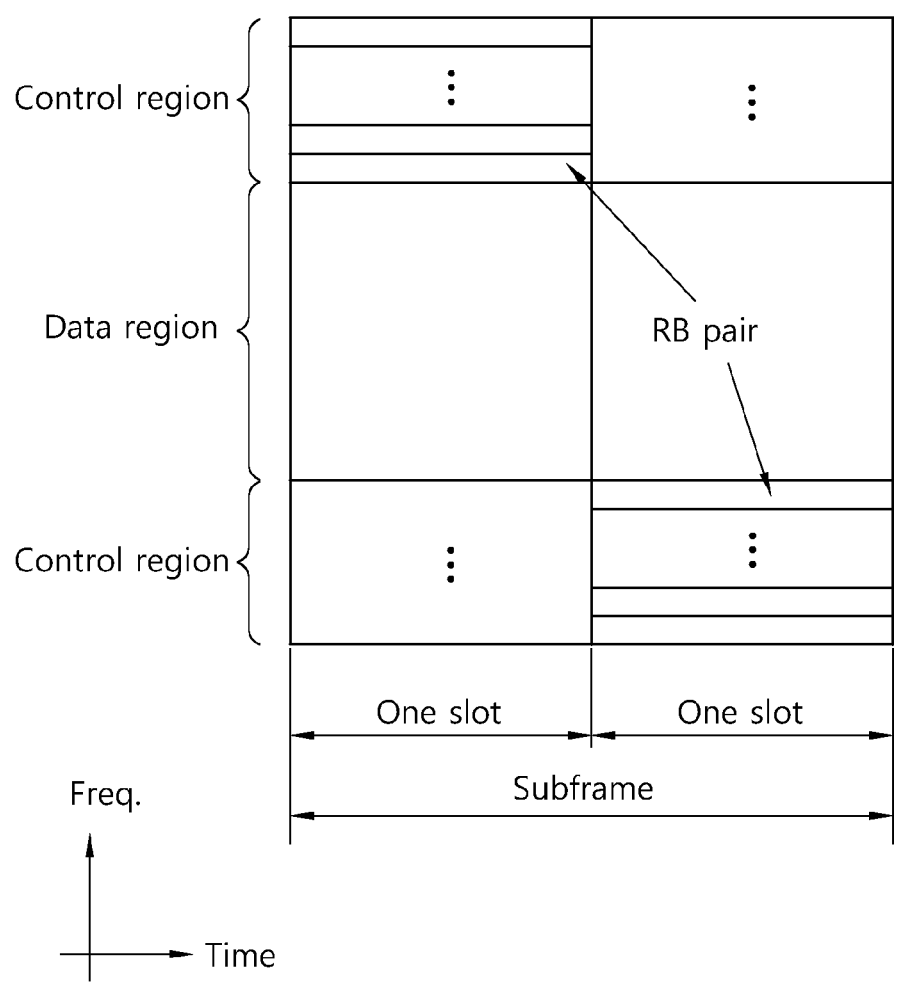
FIG. 3 shows the structure of an uplink subframe in 3rd generation partnership project (3GPP) long term evolution (LTE).

FIG. 3 shows the structure of an uplink subframe in 3rd generation partnership project (3GPP) long term evolution (LTE).

Referring FIG. 3, an uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. If indicated by a higher layer, the user equipment may support simultaneous transmission of the PUCCH and the PUSCH.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a channel quality indicator (CQI), a precoding matrix indicator (PMI), an HARQ, a rank indicator (RI), or the like. Or the uplink data may include only control information.

The following description is about a PUCCH.

The PUCCH for one UE is allocated in an RB pair. RBs belonging to the RB pair occupy different subcarriers in each of a 1st slot and a 2nd slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

EMBODIMENTS OF THE PRESENT INVENTION

Embodiments of the present invention provide a secure communication method and system based on a bit error probability.

Specifically, the first embodiment proposes a method for transmitting security data on a discrete input channel, the second embodiment proposes a method for transmitting security data on a Gaussian block fading channel, and the third embodiment proposes a method for transmitting security data using a Maximal Distance Separable (MDS) code on a block erasure channel.

Hereinafter, embodiments of the present invention are described in detail.

I. The First Embodiment—A Method for Transmitting Security Data on a Discrete Input Channel $x_i$ denotes a data symbol transmitted by Alice (a data transmitting terminal) at the i-th time slot, $h_b$ denotes a channel between Alice and Bob (a data receiving terminal), and $h_e$ denotes a channel between Alice and Eve (or the third terminal which may eavesdrops data).

Suppose that a channel is changed slowly and fixed for time slot n which is a code word length.

The channel values $h_b$ and $h_e$ may have a different value for the next code word. This kind of channel is called 'quasi-static channel,'

In this case, a receipt signal for Bob $y_{b,i}$ and a receipt signal for Eve $y_{e,i}$ are given as below:

$$y_{b,i} = h_b x_i + \eta_{b,i}, \; i=1,\ldots,n \quad \text{[Equation 1]}$$

$$y_{e,i} = H_e x_i + \eta_{e,i}, \; i=1,\ldots,n \quad \text{[Equation 2]}$$

But, $\eta_{b,i}$ denotes white noise on Bob and is mathematically modeled into a Gaussian probability variable whose average and variance are given as 0 and $\sigma^2_b$, respectively. Similarly, $\eta_{e,i}$ denotes white noise on Eve and is mathematically modeled into a Gaussian probability variable whose average and variance are given as 0 and $\sigma^2_e$, respectively.

Suppose that a message M of K bits is transmitted by Alice.

In order to transmit the message M, it is required to use a code which consists of $2^k$ code words and has a length of n symbols. In this case, a transmission rate is given as below:

$$R = \frac{K \ln 2}{n} \text{ (nats/channel use)} \quad \text{[Equation 3]}$$

A code word transmitted by Alice is represented as $X^n$, a code word received by Bob is represented as $Y^n_b$, and a code word received by Eve is represented as $Y^n_e$.

A channel of Bob is represented as conditional probability distribution $f_{Y_b|X}(y_b|x)$, and a channel of Bob is represented as $f_{Y_e|X}(Y_e|x)$.

Data to be decoded by Bob is represented as $\hat{M}_b$, and data to be decoded by Eve is represented as $\hat{M}_e$.

In addition, a channel capacity of a channel of Bob is represented as $C_b$, and a channel capacity of a channel of Eve is represented as $C_e$.

Alice may transmit data by selecting a specific code word from a plurality of code words included in a mother code.

1.1 Upper Bound of a Block Error Probability for Bob (including quotations from "R. G. Gallager, Information Theory and Reliable Communications. New York: Wiley, 1968.")

A code used by Alice to transmit data is C, and each symbol of this code may occur randomly using an input probability distribution $q(x)$.

If a discrete code C is given, a block decoding probability is represented as $$P_{err}^b(R|C) = Pr(M \neq \hat{M}_b|C).$$

In the case where $R<C_b$, an average error probability for the ensemble of all random codes generated by the probability distribution $q(x)$ has an upper bound, as below:

$$P_{err}^b(R) = \mathbb{E}[P_{err}(R|C)] \leq P_{err}^{b,U}(R, \rho, q(x))$$ [Equation 4]

Thus, the above BER upper bound may be determined based on a transmission rate corresponding the mother code and channel information regarding the receiving terminal.

In the above, an error upper bound (or a BER upper bound) is given as the following equation:

$$P_{err}^{b,U}(R, \rho, q(x)) = \exp(-n\{E_0^b(\rho, q(x)) - \rho R\}), 0 \leq \rho \leq 1.$$ [Equation 5]

In the above, a Gallager function $E_0^b(\rho, q(x))$ is given as below:

$$E_0^b(\rho, q(x)) = -\ln \sum_{y_b} \left[ \sum_x q(x) f_{Y_b|X}(y_b|x)^{\frac{1}{1+\rho}} \right]^{1+\rho},$$ [Equation 6]

$$0 \leq \rho \leq 1$$

If X has a consecutive value, $\Sigma_x$ is converted into $\int_x$. If $Y_b$ has a consecutive value, $\Sigma_{Y_b}$ is converted into $\int_{Y_b}$. An error Upper bound $P_{err}^{b,U}(R, \rho, q(x))$ is valid for any value of $0 \leq \rho \leq 1$ and any input probability distribution $q(x)$, and thus, the above upper bound may be optimized as below:

$$\min_{0 \leq \rho \leq 1} \min_{q(x)} P_{err}^{b,U}(R, \rho, q(x)) \text{ or}$$ [Equation 7]

$$\min_{0 \leq \rho \leq 1} \left\{ \max_{q(x)} E_0^b(\rho, q(x)) - \rho R \right\}$$

The optimal input probability distribution and the optimal value of $\rho$, which are required to optimize the upper bound as above, are represented as below:

$$\breve{q}(x) = \arg\min_{q(x)} P_{err}^{b,U}(R, \rho, q(x)) = \arg\max_{q(x)} E_0^b(\rho, q(x))$$ [Equation 8]

$$\breve{\rho} = \arg\min_{0 \leq \rho \leq 1} P_{err}^{b,U}(R, \rho, \breve{q}(x)) = \arg\max_{0 \leq \rho \leq 1} \{E_0^b(\rho, \breve{q}(x)) - \rho R\}$$ [Equation 9]

1.2 Lower Bound of a Block Error Probability for Eve (including quotations from "S. Arimoto, "On the converse to the coding theorem for discrete memoryless channels," IEEE Trans. Inf. Theory, vol., pp. 357-359, May 1973.")

First, a function $P_{err}^{e,L}(R, \rho', q'(x))$ is defined as below:

$$P_{err}^{e,L}(R, \rho', q'(x)) = 1 - \exp(-n\{E_0^e(\rho', q'(x)) - \rho' R\}),$$
$$-1 < \rho' \leq 0$$ [Equation 10]

Herein, $E_0^e(\rho', q'(x))$ is given as Equation 6, and $q(x)$, $f_{Y_b|X}(Y_b|x)$, and $\rho$ are replaced by $q'(x)$, $f_{Y_e|X}(Y_e|x)$, and $\rho'$.

In the case where $R>C_e$, for any code C, a lower bound (or a BER lower bound) of a block decoding error probability $P_{err}^e(R|C) = Pr(M \neq \hat{M}_e|C)$ is given as below:

$$P_{err}^e(R|C) \geq P_{err}^{e,L}(R, \rho', \breve{q}'(x)), \forall C$$ [Equation 11]

Thus, the BER lower bound may be determined based on the transmission rate and channel information regarding the third terminal.

But, input distribution function $\breve{q}'(x)$ is given as below:

$$\breve{q}'(x) = \arg\min_{q'(x)} P_{err}^{e,L}(R, \rho', q'(x)) = \arg\min_{q'(x)} E_0^e(\rho', q'(x))$$ [Equation 12]

The lower bound $P_{err}^{e,L}(R, \rho', \breve{q}'(x))$ given in the above is valid for any value of $-1 < \rho' \leq 0$, and thus, $\rho'$ may be optimized to make the lower bound to be as tight as possible, as below:

$$\breve{\rho}' = \arg\max_{-1 < \rho' \leq 0} P_{err}^{e,L}(R, \rho', \breve{q}'(x)) =$$ [Equation 13]

$$\arg\max_{-1 < \rho' \leq 0} \{E_0^e(\rho', \breve{q}'(x)) - \rho' R\}$$

1.3 BER Upper Bound for Bob and BER Lower Bound for Eve in the Case Where an Error is Amplified by Substitution Permutation Network (SPN)

In the case where $C_e < R < C_b$, if a code length n increases, a block error probability for Bob may be close to 0 and a block error probability for Eve may be close to 1.

However, a block error probability being close to 1 does not necessarily indicate secure data transmission. For example, if a single bit error always occurs within a block, a block error probability may be 1, but Eve may decode all the bits other than that specific error bit.

In order to solve this problem, an error is amplified by a SPN.

Figure 4:
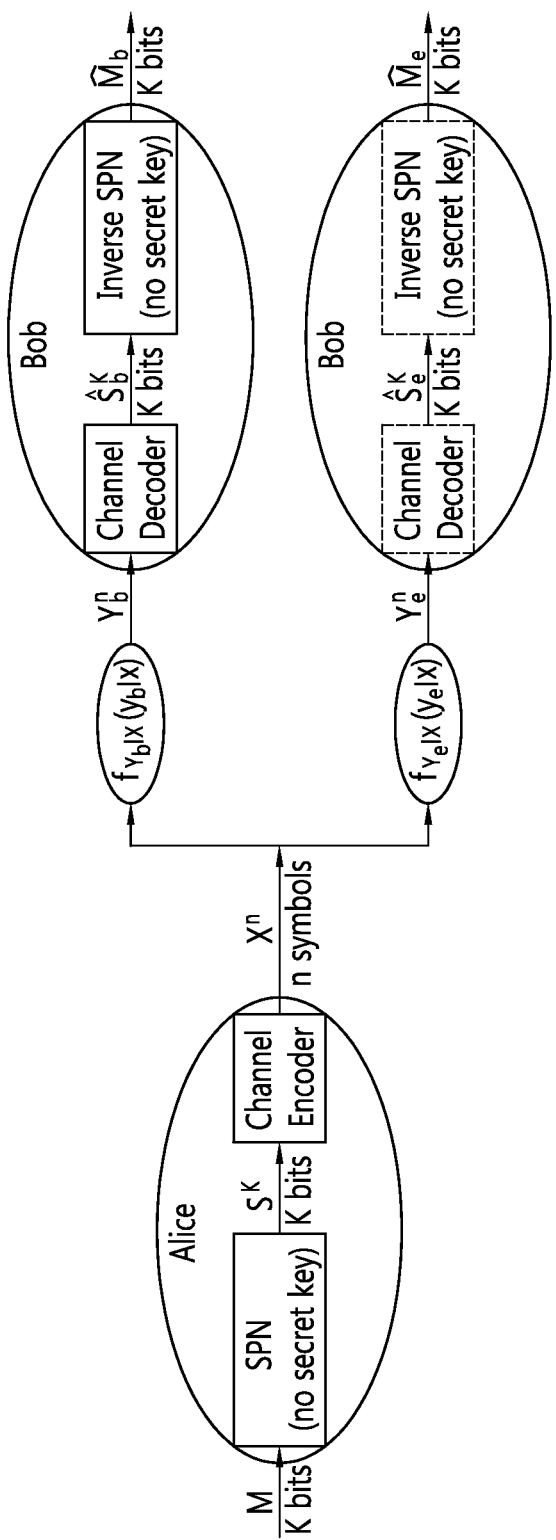
FIG. 4 is a conceptual diagram illustrating a secure communication system using a Substitution Permutation Network (SPN) in a Discrete Memoryless Channel (DMC).

FIG. 4 is a conceptual diagram illustrating a secure communication system using an SPN on a Discrete Memoryless Channel (DMC).

Referring to FIG. 4, if a block error does not occur in a receiving end (Bob or Eve), error amplification is not performed by the SPN. However, if a block error occurs, that is, if even a single bit error occurs in a block, the error is amplified by the SPN.

If the SPN is used, a bit error rate (BER) may be very close to 0.5 due to error amplification.

As shown in Equation 4, an upper bound $P_{err}^b(R) \leq P_{err}^{b,U}(R, \breve{\rho}, \breve{q}(x))$ is given for a block error probability for Bob.

Thus, the BER upper bound is given as below:

$$P_{BER}^b(R) \leq 0.5 P_{err}^{b,U}(R, \check{\rho}, \check{q}(x)), \quad 0 \leq \rho \leq 1 \quad \text{[Equation 14]}$$
$$=: P_{BER}^{b,U}(R, \check{\rho}, \check{q}(x)).$$

As shown in Equation 11, a lower bound $P_{err}^e(R) \geq P_{err}^{e,L}(R, \check{\rho}', \check{q}'(x))$ is given for a block error probability for Eve.

In addition, in the case where the SPN is used, error amplification occurs. If any single bit error occurs in a receiver of the SPN, an error probability in an output end is represented as $P_{BER}^{SPN,L}$.

This probability $P_{BER}^{SPN,L}$ may be obtained by an equation or computer simulation.

In this case, a BER lower bound is given as below:

$$P_{BER}^e(R) \geq P_{BER}^{SPN,L} P_{err}^{e,L}(R, \check{\rho}', \check{q}'(x)), \quad -1 < \rho' \leq 0 \quad \text{[Equation 15]}$$
$$=: P_{BER}^{e,L}(R, \check{\rho}', \check{q}'(x))$$

But, q̌'(x) is given as Equation 12.

In general, q̌(x)≠q̌'(x). Herein, q̌(x) is used to obtain the tightest BER upper bound for Bob, and q̌'(x) is used to obtain a BER lower bound for Eve.

The input probability distribution used by Alice to cause a random code to occur is q̌(x). Despite the fact that q̌(x)≠q̌'(x) is valid in general, the two probability distribution functions can be a uniform probability distribution function in the case of symmetric DMCs.

$$q_{equ}(x) = \check{q}(x) = \check{q}'(x) \quad \text{[Equation 16]}$$

But, $q_{equ}(x)$ denotes a uniform probability distribution function.

1.4 Upper Bound and Lower Bound of a Transmission Rate in the Case Where a Code Length is Limited To avoid occurrence of too many errors in data to be transmitted to Bob, a BER upper bound for Bob needs to be less than a certain reference value $0 < P_{BER}^{b,Th} \leq 0.5$;

$$P_{BER}^b(R) \leq P_{BER}^{b,U}(R, \check{\rho}, \check{q}(x)) \leq P_{BER}^{b,Th} \quad \text{[Equation 17]}$$

In the above, the BER reference value $P_{BER}^{b,Th}$ may be converted into a block error probability reference value $0 < P_{err}^{b,Th} \leq 1$, as below:

$$P_{BER}^{b,Th} = 0.5 P_{err}^{b,Th} \quad \text{[Equation 18]}$$

For reliable data transmission toward Bob, $P_{err}^{b,Th}$ should be a sufficiently small value (for example, $10^{-4}$ or $10^{-5}$).

To cause errors as many as possible in data to be transmitted to Eve, a BER lower bound for Eve needs to be greater than a predetermined reference value $P_{BER}^{e,Th}$;

$$P_{BER}^e(R) \geq P_{BER}^{e,L}(R, \check{\rho}', \check{q}'(x)) \geq P_{BER}^{e,Th}. \quad \text{[Equation 19]}$$

In the above, the BER reference value $P_{BER}^{e,Th}$ may be converted into a block error probability reference value $0 \leq P_{err}^{e,Th} < 1$, as below:

$$P_{BER}^{e,Th} = P_{BER}^{SPN,L} P_{err}^{e,Th} \quad \text{[Equation 20]}$$

$P_{err}^{e,Th}$ should be a sufficiently great value (for example, $1-10^{-4}$ or $1-10^{-5}$).

When determining a data transmission rate R, the above condition should be satisfied. To do this end, the upper bound $R_{sup}$ and the lower bound $R_{inf}$ of the data transmission rate may be obtained as below:

$$R_{sup} = \sup_{0 \leq R < C_b} R \text{ subject to } P_{BER}^{b,U}(R, \check{\rho}, \check{q}(x)) \leq P_{BER}^{b,Th} \quad \text{[Equation 21]}$$

$$R_{inf} = \inf_{R > C_e} R \text{ subject to } P_{BER}^{e,L}(R, \check{\rho}', \check{q}'(x)) \geq P_{BER}^{e,Th} \quad \text{[Equation 22]}$$

In particular, $\Delta R_b := C_b - R_{sup}$, which is a difference between a channel capacity and a transmission upper bound for Bob, should be limited as below:

$$\Delta R_b = -\frac{1}{n\check{\rho}} \ln P_{err}^{b,Th} + C_b - \frac{1}{\check{\rho}} E_0^b(\check{\rho}, \check{q}(x)) \quad \text{[Equation 23]}$$
$$\geq -\frac{1}{n\check{\rho}} \ln P_{err}^{b,Th}$$
$$> 0$$

But, the optimal value of ρ̌ is determined by ρ̌=arg max$_{0 < \rho \leq 1}$ {$E_0^b(\rho, \check{q}(x)) - \rho R_{sup}$}. In addition, $\Delta R_e := R_{inf} - C_e$, which is a difference between a channel capacity and a transmission lower bound for Eve, should be limited as below:

$$\Delta R_e = \frac{1}{n\check{\rho}'} \ln(1 - P_{err}^{e,Th}) + \frac{1}{\check{\rho}'} E_0^e(\check{\rho}', \check{q}'(x)) - C_e \quad \text{[Equation 24]}$$
$$\geq \frac{1}{n\check{\rho}'} \ln(1 - P_{err}^{e,Th})$$
$$> 0$$

But, the optimal value of ρ̌' is determined by ρ̌'=arg max$_{-1 < \rho' < 0}$ {$E_0^e(\rho', \check{q}'(x)) - \rho' R_{inf}$}. In the above equation, $\Delta R_b$ should be always a positive number, and it needs to be disproportionate to the size of n and ρ̌ and to a log value of $P_{err}^{b,Th}$. In addition, $\Delta R_c$ also has the similar proportional/disproportional relationship.

II. The Second Embodiment—A Method for Transmitting Security Data on a Gaussian Block Fading Channel In the case where a code word length n is long enough, assuming that a channel is completely fixed for duration of the code word may not be suitable for the real system.

To solve this problem, 'block fading' model, which is a more realistic channel, may be considered. To this end, coherence time for Bob's channel and Eve's channel are represented as $T_c^b$ and $T_c^e$, respectively. In addition, $T_s$ is assumed to be time required to transmit one symbol.

Now, suppose that $T_c^b$ and $T_c^e$ are given as below:

$$T_c^b = N_b T_s \text{ and } T_c^e = N_e T_s.$$

That is, a channel of Bob is not changed while $N_b$ symbols are transmitted, and a channel of Eve is changed while $N_e$ symbols are transmitted. A group of the symbols is called a 'channel block.' It is assumed that $N_b$ channel blocks exist for length n of one code word in the case of Bob, while $N_e$ channel blocks exist for length n of one code word in the case of Eve.

$$n = N_b L_b = N_e L_e \quad \text{[Equation 25]}$$

$x_k$ is a data symbol transmitted by Alice at the k-th time slot. For convenience of explanation, $x_k$ is represented as $x_{b,il}$ or $x_{e,il}$.

Herein, $x_{b,il}$ is a symbol that is transmitted in the order of $k=(i+N_b(l-1))$, and, since $x_k$, it is determined as below: $x_{b,il}=x_i+Nb(l-1)$ for $i=1, \ldots, N_b$; $l=1, \ldots, L_b$.

In addition, $x_{e,il}$ is a symbol that is transmitted in the order of $k=(i+N_e(l-1))$, and, since $x_k$, it is determined as below: $x_{e,il}=x_i+N_e(l-1)$ for $i=1, \ldots, N_e$; $l=1, \ldots, L_e$.

By using this notation, a signal received by Bob and Eve for duration of one code word may be mathematically written as below:

$$y_{b,il}=h_{b,l}x_{b,il}+\eta_{b,il},\ i=1,\ldots,N_b;\ l=1,\ldots,L_b \quad \text{[Equation 26]}$$

$$y_{e,il}=h_{e,l}x_{b,il}+\eta_{e,il},\ i=1,\ldots,N_e;\ l=1,\ldots,L_e \quad \text{[Equation 27]}$$

But, $\eta_{b,il}$ denotes white noise on Bob and is mathematically modeled into a Gaussian probability variable whose average and variance are given as 0 and $\sigma^2_b$, respectively. Similarly, $\eta_{e,il}$ denotes white noise on Eve and is mathematically modeled into a Gaussian probability variable whose average and variance are given as 0 and $\sigma^2_e$, respectively.

Channels of Bob and Eve are represented in a form of vector as below:

$$h_{1:L_b}^b=(h_{b,1},\ldots,h_{b,L_b}) \quad \text{[Equation 28]}$$

$$h_{1:L_e}^e=(h_{e,1},\ldots,h_{e,L_e}) \quad \text{[Equation 29]}$$

A transmission rate R is given as below:

$$R = \frac{\ln M}{n} = \frac{\ln M}{N_b L_b} = \frac{\ln M}{N_e L_e} \quad \text{[Equation 30]}$$

A block fading channel is a general channel model whose typical examples are a static channel and an ergodic channel.

In the case of $N_b=N_e=n$ and $L_b=L_e=1$, the block fading channel may be simplified as the aforementioned static fading channel.

In addition, in the case of $N_b=N_e=1$ and $L_b=L_e=n\gg 1$, the block fading channel may be simplified as an ergodic channel.

2.1 BER Bounds for Bob and Eve in the Case of Gaussian Input

Suppose that an input probability distribution q(x) is given in a form of Gaussian distribution $x_{ij}\sim N(0,p)$, but $\mathbb{E}[x_{ij}]=p$.

In this case, an upper bound of a block error probability for Bob and a lower bound of a block error probability for Eve are given as below:

$$P_{err}^{U,b}(R,\rho,h_{1:L_b}^b)=\exp(-nE_b(R,\rho,h_{1:L_b}^b)),\ 0\leq\rho\leq 1 \quad \text{[Equation 31]}$$

$$P_{err}^{L,e}(R,\rho',h_{1:L_e}^e)=1-\exp(-nE_e(R,\rho',h_{1:L_e}^e)),\ -1<\rho'\leq 0 \quad \text{[Equation 32]}$$

But, $$E_b(R,\rho,h_{1:L_b}^b)=E_0^b(\rho,h_{1:L_b}^b)-\rho R \quad \text{[Equation 33]}$$

$$E_e(R,\rho',h_{1:L_e}^e)=E_0^e(\rho',h_{1:L_e}^e)-\rho'R. \quad \text{[Equation 34]}$$

In the above equation, a Gallager function for a block fading channel is given as below:

$$E_0^b(\rho,h_{1:L_b}^b)=-\frac{1}{L_b}\sum_{l=1}^{L_b}\ln\left(1+\frac{p|h_{b,l}|^2}{\sigma_b^2(1+\rho)}\right)^{-\rho} \quad \text{[Equation 35]}$$

$$0\leq\rho\leq 1$$

$$E_0^e(\rho',h_{1:L_e}^e)=-\frac{1}{L_e}\sum_{l=1}^{L_e}\ln\left(1+\frac{p|h_{e,l}|^2}{\sigma_e^2(1+\rho')}\right)^{-\rho'} \quad \text{[Equation 36]}$$

$$-1<\rho'\leq 0.$$

In conclusion, the upper bound of a block error probability for Bob and the lower bound of a block error probability for Eve are given as below:

$$P_{err}^{U,b}(R,\rho,h_{1:L_b}^b)= \quad \text{[Equation 37]}$$
$$\exp\left(-n\left[\frac{1}{L_b}\rho\sum_{l=1}^{L_b}\ln\left(1+\frac{p|h_{b,l}|^2}{\sigma_b^2(1+\rho)}\right)-\rho R\right]\right),$$
$$0\leq\rho\leq 1$$

$$P_{err}^{L,e}(R,\rho',h_{1:L_e}^e)= \quad \text{[Equation 38]}$$
$$1-\exp\left(-n\left[\frac{1}{L_e}\rho'\sum_{l=1}^{L_e}\ln\left(1+\frac{p|h_{e,l}|^2}{\sigma_e^2(1+\rho')}\right)-\rho'R\right]\right),$$
$$-1<\rho'\leq 0$$

In the case where error amplification is performed by an SPN, a BER upper bound of Bob and a BER lower bound for Eve are given as below:

$$P_{BER}^{U,b}(R,\rho,h_{1:L_b}^b)=0.5P_{err}^{U,b}(R,\rho,h_{1:L_b}^b),\ 0\leq\rho\leq 1 \quad \text{[Equation 39]}$$

$$P_{BER}^{L,e}(R,\rho',h_{1:L_e}^e)=P_{BER}^{SPN,L}P_{err}^{L,e}(R,\rho',h_{1:L_e}^e),$$
$$-1<\rho'\leq 0 \quad \text{[Equation 40]}$$

2.2 Optimized Power Control in the Case of Limited Transmission Delay Time

In the following, there is described a system under the assumption that Bob and Eve have the same channel coherence time However, the proposed method may be also applied to the case where Bob and Eve have a different channel coherence time.

The fact that Bob and Eve have the same channel coherence time means that the following equation is valid:

$$N_b=N_e=N \text{ and } L_b=L_e=L \quad \text{[Equation 41]}$$

In this case, a transmission rate is given as below:

$$R = \frac{\ln M}{n} = \frac{\ln M}{LN} \quad \text{[Equation 42]}$$

(nats/channel use)

2.2.1 When Channels of Bob and Eve are Non-Casually Known by Alice

Suppose that channel vectors $h_{1:L}^b$ and $h_{1:L}^e$ of Bob and Eve are known by Alice beforehand.

This channel model may be used in a system using multi-carriers in the case where each of $h_{1:L}^b$ and $h_{1:L}^e$ indicates a channel corresponding to each carrier frequency.

As such, if a channel is known, optimization of transmission power is performed as below:

$$\min_{p_l} P_{BER}^{b,U}(R,\rho,h_{1:L}^b) \quad \text{[Equation 43]}$$

-continued $$\text{subject to } P_{BER}^{e,L}(R, \rho', h_{1:L}^e) \geq \mathcal{P}_{BER}^{e,Th} \quad \text{[Equation 44]}$$

In the above optimization issue, the condition $P_{BER}^{e,L}(R, \rho', h_{1:L}^e) \geq P_{BER}^{e,Th}$ includes a condition for limiting the maximum transmission power.

That is, to satisfy $P_{BER}^{e,L}(R, \rho', h_{1:L}^e) \geq P_{BER}^{e,Th}$, average transmission power necessarily satisfies a condition of $\mathbb{E}[p] \leq p_{av}$ for any given value of $\rho_{av}$.

By using the above equation regarding BER bounds of Bob and Eve, the optimization issue may be written as below:

$$\max_{p_l} \sum_{l=1}^{L} \ln\left(1 + \frac{p_l |h_{b,l}|^2}{\sigma_b^2(1+\rho)}\right) \quad \text{[Equation 45]}$$

$$\text{subject to } \sum_{l=1}^{L} \ln\left(1 + \frac{p_l |h_{e,l}|^2}{\sigma_e^2(1+\rho')}\right) \leq \beta \quad \text{[Equation 46]}$$

But, $$\beta = LR - \frac{L}{n\rho'} \ln\left(1 - \frac{\mathcal{P}_{BER}^{e,Th}}{P_{BER}^{SPN,L}(r, K)}\right) \quad \text{[Equation 47]}$$

The solution for this optimization issue is given as below:

$$p_l^{opt} = \frac{1}{1-\lambda}\left(\lambda \frac{\sigma_e^2(1+\rho')}{|h_{e,l}|^2} - \frac{\sigma_b^2(1+\rho)}{|h_{b,l}|^2}\right)^+, \quad \text{[Equation 48]}$$

$$l = 1, 2, \ldots, L$$

But, $\lambda$ is determined as below:

$$\sum_{l=1}^{L} \ln\left(1 + \frac{p_l^{opt}|h_{e,l}|^2}{\sigma_e^2(1+\rho')}\right) = \beta \quad \text{[Equation 49]}$$

In the optimized power transmission method obtained above, as shown in the equation, if a channel of Bob becomes better (that is, $|h_{b,l}|$ increases), the optimal transmission power $p_l^{opt}$ increases, and, if a channel of Eve becomes better (that is, $|h_{e,l}|^2$ increases), the optimal transmission power $P_l^{opt}$ decreases.

2.2.2 When Channels of Bob and Eve are Casually Known by Alice

Suppose that channels of Bob and Eve are casually known by Alice

If channel information regarding the first channel block is given, the power optimization issue may be considered as below:

$$\max_{p_l} \left\{ \ln\left(1 + \frac{p_1|h_{b,1}|^2}{\sigma_b^2(1+\rho)}\right) + \sum_{l=2}^{L} \ln\left(1 + \frac{p_l|h_{b,l}|^2}{\sigma_b^2(1+\rho)}\right) \right\} \quad \text{[Equation 50]}$$

$$\text{subject to } \ln\left(1 + \frac{p_1|h_{e,1}|^2}{\sigma_e^2(1+\rho')}\right) + \quad \text{[Equation 51]}$$

$$\sum_{l=2}^{L} \ln\left(1 + \frac{p_l|h_{e,l}|^2}{\sigma_e^2(1+\rho')}\right) \leq \beta$$

But, herein, the future channel information $h_{b,l}$ and $h_{e,l}$, $l=2, \ldots, L$ are not known.

To solve this problem mathematically, as disclosed in "K.-K. Wong, "Stochastic power allocation using casual channel information for delay limited communications," IEEE Common. Lett., vol. 10, pp. 748-750, November 2006.", unknown future channel information is replaced by an average value thereof.

An average value of a channel of Bob and an average value of a channel of Eve are represented as $\xi_b = \mathbb{E}[|h_{b,l}|^2]$ and $\xi_e = \mathbb{E}[|h_{e,l}|^2]$ As such, under the assumption that all the future channels are the same, an optimal power value for all the future channel blocks should be the same as well: $p_2 = \ldots = p_L = p$.

In conclusion, the power optimization issue is given as below:

$$\max_{p_1, p} \left\{ \ln\left(1 + \frac{p_1|h_{b,1}|^2}{\sigma_b^2(1+\rho)}\right) + (L-1)\ln\left(1 + \frac{p\xi_b}{\sigma_b^2(1+\rho)}\right) \right\} \quad \text{[Equation 52]}$$

$$\text{subject to } \ln\left(1 + \frac{p_1|h_{e,1}|^2}{\sigma_e^2(1-\rho')}\right) + \quad \text{[Equation 53]}$$

$$(L-1)\ln\left(1 + \frac{p\xi_e}{\sigma_e^2(1+\rho')}\right) \leq \beta$$

A solution for the power optimization issue is given as below:

$$p_1^{opt} = \frac{1}{1-\lambda}\left(\lambda \frac{\sigma_e^2(1+\rho')}{|h_{e,1}|^2} - \frac{\sigma_b^2(1+\rho)}{|h_{b,1}|^2}\right)^+ \quad \text{[Equation 54]}$$

$$p_{l,\rightarrow}^{opt} = \frac{1}{1-\lambda}\left(\lambda \frac{\sigma_e^2(1+\rho')}{\xi_e} - \frac{\sigma_b^2(1+\rho)}{\xi_b}\right)^+, \quad \text{[Equation 55]}$$

$$l = 2, \ldots, L$$

But, $\lambda$ is given as below:

$$\ln\left(1 + \frac{p_1^{opt}|h_{e,1}|^2}{\sigma_e^2(1+\rho')}\right) + \sum_{l=2}^{L} \ln\left(1 + \frac{p_{l,\rightarrow}^{opt}|h_{e,l}|^2}{\sigma_e^2(1+\rho')}\right) = \beta \quad \text{[Equation 56]}$$

Herein, $p_1^{opt}$ is actually used as an optimal power allocation value for the i first channel block, but the other power allocation values $p_{l,\rightarrow}^{opt}$, $l=2, \ldots, L$ are mathematically used only to obtain $\lambda$.

In general, the optimal transmission power for the k-th channel block is given as below:

$$p_k^{opt} = \frac{1}{1-\lambda}\left(\lambda \frac{\sigma_e^2(1+\rho')}{|h_{e,k}|^2} - \frac{\sigma_b^2(1+\rho)}{|h_{b,k}|^2}\right)^+ \quad \text{[Equation 57]}$$

But, λ is determined as below:

$$\sum_{l=1}^{k-1} \ln\left(1 + \frac{p_{l,\leftarrow}^{opt}|h_{e,l}|^2}{\sigma_e^2(1+\rho')}\right) + \quad \text{[Equation 58]}$$

$$\ln\left(1 + \frac{p_k^{opt}|h_{e,k}|^2}{\sigma_e^2(1+\rho')}\right) + \sum_{l=k+1}^{L} \ln\left(1 + \frac{p_{l,\rightarrow}^{opt}|h_{e,l}|^2}{\sigma_e^2(1+\rho')}\right) = \beta$$

In the above equation, $p_{l,\leftarrow}^{opt}$ denotes optimal power that is actually used with respect to a previous channel block.

2.3 Secure Hybrid Automatic Repeat Request (HARQ)

If a single code words is transmitted for L channel block, a data transmission rate is given as below:

$$R_L = \frac{\ln M}{n} = \frac{\ln M}{LN} \text{ (nats/channel use)} \quad \text{[Equation 59]}$$

In the case where the number of code words are fixed to be M, if a length of a code word increases (that is, in the case where n or L increases), a data transmission rate $R_L$ decreases. If the data transmission rate decreases, a BER upper bound $P_{BER}^{U,b}(R_L, \rho, h_{1:L}^b)$ of Bob decreases. In addition, a BER lower bound $P_{BER}^{L,e}(R_L, \rho', h_{1:L}^e)$ of EVE also decreases.

2.3.1 When Channel Information of Bob and Eve is Known by Alice

HARQ Transmission Method 1:

(Step 1): Configure a Mother Code

If n symbols are randomly formed with Gaussian distribution, the symbols constitute one code word. M code words are formed as above and used as a code. A data transmission rate of the mother code is given as $$R_L = \frac{\ln M}{n} = \frac{\ln M}{NL} \text{ (nats/channel use).}$$

When a mother code is configured, size of L should be big enough.

(Step 2): The First Transmission

At the first transmission, a code to be transmitted is selected first according to a message and then only the portion corresponding to the first $L_1 = t_1$ channel block of the code word is transmitted. Herein, $t_1 = 1, \ldots, L$.

Thus, a transmission rate at the first transmission is give as below:

$$R_{L_1} = \frac{\ln M}{L_1 N} \text{ (nats/channel use)} \quad \text{[Equation 60]}$$

Proceed With (Step 4)

(Step 3): The i-th Transmission (i≥2)

At the i-th transmission, data corresponding to the $t_i$ channel blocks are further transmitted. But, $t_i = 1, \ldots, L - L_{i-1}$.

In conclusion, after the i-th transmission is completed, the transmission rate $R_{Li}$ is given as below:

$$R_{L_i} = \frac{\ln M}{L_i} \text{ (nats/channel use)} \quad \text{[Equation 61]}$$

But, $$L_i = L_{i-1} + t_i \quad \text{[Equation 62]}$$

Proceed With (Step 4)

(Step 4): Determine Whether to Retransmit Data

After the i-th transmission is completed (i≥1), BER bounds for Bob and Eve are calculated, as below:

$$P_{BER}^{U,b}(R_{L_i}, \rho, h_{1:L_i}^b) = \quad \text{[Equation 63]}$$

$$0.5 \exp\left(-n\rho\left[\frac{1}{L_i}\sum_{l=1}^{L_i}\ln\left(1 + \frac{p|h_{b,l}|^2}{\sigma_b^2(1+\rho)}\right) - R_{L_i}\right]\right)$$

$$P_{BER}^{L,e}(R_{L_i}, \rho', h_{1:L_i}^e) = P_{BER}^{SPN,L}(r, K) \quad \text{[Equation 64]}$$

$$\left(1 - \exp\left(-n\rho'\left[\frac{1}{L_i}\sum_{l=1}^{L_i}\ln\left(1 + \frac{\rho|h_{e,l}|^2}{\sigma_e^2(1+\rho')}\right) - R_{L_i}\right]\right)\right)$$

But, $0 \le \rho < 1$ and $-1 < \rho' \le 0$.

Then, one of three following determinations is made:

i) If the following condition is satisfied, stop transmission and declare that the transmission is successful:

$$P_{BER}^{U,b}(R_{L_i}, \rho, h_{1:L_i}^b) \le P_{BER}^{b,Th} \text{ and } P_{BER}^{L,e}(R_{L_i}, \rho', h_{1:L_i}^e) \ge P_{BER}^{e,Th} \quad \text{[Equation 65]}$$

ii) if the following condition is satisfied, stop transmission and declare that the transmission is not successful:

$$P_{BER}^{U,b}(R_{L_i}, \rho, h_{1:L_i}^b) > P_{BER}^{b,Th} \text{ and } P_{BER}^{L,e}(R_{L_i}, \rho', h_{1:L_i}^e) < P_{BER}^{e,Th} \quad \text{[Equation 66]}$$

iii) if the following condition is satisfied, proceed with (Step 3)

$$P_{BER}^{U,b}(R_{L_i}, \rho, h_{1:L_i}^b) > P_{BER}^{b,Th} \text{ and } P_{BER}^{L,e}(R_{L_i}, \rho', h_{1:L_i}^e) > P_{BER}^{e,Th} \quad \text{[Equation 67]}$$

The above algorithm enables data transmission regardless of a status of a channel.

If Bob's channel is not better enough compared with Eve's channel, successful data transmission may not be achieved easily.

To solve this problem, data can be transmitted only when Bob's channel is good by a specific standard while Eve's channel is bad by a specific standard.

In this case, if a value of L increases, $P_{BER}^{U,b}(R_{L_i}, \rho, h_{1:L}^b)$ decreases more quickly but $P_{BER}^{U,b}(R_{L_i}, \rho', h_{1:L}^e)$ decreases more slowly.

HARQ Transmission Method 2:

Use HARQ transmission method 1 in a manner of transmitting data only when the current channel block satisfies the following condition, and, if not, waiting until the following condition is satisfied.

$$|h_{b,l}| \ge h_b^{Th} \text{ and } |h_{e,l}| \le h_e^{Th}, l = 1, 2, \ldots \quad \text{[Equation 68]}$$

2.3.2 When Channel Information of Eve is Known by Alice and There is a Feedback Channel for ACK From Bob In the case where there is a feedback channel for ACK from Bob (that is, in the case where an ACK/NACK message is transmitted by Bob), if Bob is able to perform decoding successfully, transmit ACK=1 (the ACK message) to Alice, and, if not, transmit ACK=0 (the NACK message) to Alice.

HARQ Transmission Method 3:

In the case where there is a feedback channel for ACK from Bob, (Step 4) in HARQ transmission method 1 is changed as below:

If the following condition is satisfied, stop transmission and declare that the transmission is successful:

$$\text{ACK}=1 \text{ and } P_{BER}^{L,e}(R_{L_i},\rho',h_{1:L_i}^e) \geq P_{BER}^{e,Th} \quad \text{[Equation 69]}$$

If the following condition is satisfied, stop transmission and declare that the transmission is not successful:

$$\text{ACK}=0 \text{ and } P_{BER}^{L,e}(R_{L_i},\rho',h_{1:L_i}^e) < P_{BER}^{e,Th} \quad \text{[Equation 70]}$$

If the following condition is satisfied, proceed with (Step 3):

$$\text{ACK}=0 \text{ and } P_{BER}^{L,e}(R_{L_i},\rho',h_{1:L_i}^e) > P_{BER}^{e,Th} \quad \text{[Equation 71]}$$

Similarly to HARQ transmission method 2, data transmission is possible only when Bob's channel is good by a specific standard while Eve's channel is bad by a specific standard.

HARQ Transmission Method 4:

Use HARQ transmission method 3 in a manner of transmitting data only when the current channel block satisfies the following condition, and, if not, waiting until the following condition is satisfied.

$$|h_{b,l}| \geq h_b^{Th} \text{ and } |h_{e,l}| \leq h_e^{Th}, \ l=1,2,\ldots \quad \text{[Equation 72]}$$

2.3.3 When Channel Information of Eve is not Known by Alice

In the case where channel information of Eve is not known by Alice, BER lower bound $P_{BER}^{L,e}(R_{L_i}, \rho', h_{1:L_i}^e)$ becomes a probability variable.

In this case, a security condition is converted as below:

$$Pr(P_{BER}^{L,e}(R_{L_i},\rho',h_{1:L_i}^{e,Th})) \leq \delta \quad \text{[Equation 73]}$$

HARQ Transmission Method 5:

In the case where channel information of Eve is not known by Alice, (Step 4) in HARQ transmission method 1 or HARQ transmission method 3 is converted as below:

If the following condition is satisfied, stop transmission and declare that the transmission is successful:

$$P_{BER}^{U,b}(R_{L_i}\rho,h_{1:L_i}^b) \leq P_{BER}^{b,Th} \text{ and } Pr(P_{BER}^{L,e}(R_{L_i}\rho', h_{1:L_i}^e) < P_{BER}^{e,Th})) \leq \delta \quad \text{[Equation 74]}$$

Or, $$\text{ACK}=1 \text{ and } Pr(P_{BER}^{L,e}(R_{L_i},\rho',h_{1:L_i}^e) < P_{BER}^{e,Th}) \leq \delta \quad \text{[Equation 75]}$$

If the following condition is not satisfied, stop transmission and declare that the transmission is not successful:

$$P_{BER}^{U,b}(R_{L_i}\rho,h_{1:L_i}^b) > P_{BER}^{b,Th} \text{ and } Pr(P_{BER}^{L,e}(R_{L_i}\rho', h_{1:L_i}^e) < P_{BER}^{e,Th})) > \delta \quad \text{[Equation 76]}$$

Or, $$\text{ACK}=0 \text{ and } Pr(P_{BER}^{L,e}(R_{L_i},\rho',h_{1:L_i}^e) < P_{BER}^{e,Th}) > \delta \quad \text{[Equation 77]}$$

If the following condition is satisfied, proceed with (Step 3):

$$P_{BER}^{U,b}(R_{L_i}\rho,h_{1:L_i}^b) > P_{BER}^{b,Th} \text{ and } Pr(P_{BER}^{L,e}(R_{L_i}\rho', h_{1:L_i}^e) < P_{BER}^{e,Th})) \leq \delta \quad \text{[Equation 78]}$$

Or, $$\text{ACK}=0 \text{ and } Pr(P_{BER}^{L,e}(R_{L_i},\rho',h_{1:L_i}^e) < P_{BER}^{e,Th}) \leq \delta \quad \text{[Equation 79]}$$

HARQ Transmission Method 5 may be Summarized as Below:

In the case where a terminal transmits data using a specific code word selected from among a plurality of code words included in a mother code, the terminal may calculate a BER upper bound for a receiving terminal, which receives the data, and a BER lower bound for the third terminal, which is possibly able to eavesdrop the data, and perform HARQ based on at least one of whether an ACK/NACK message is an ACK message or a NACK message, whether the BER upper bound is smaller than a BER reference level for the receiving terminal, and whether a probability of the BER lower bound to be smaller than a BER reference level for the third terminal is smaller than a predetermined value.

The BER upper bound is determined based on a transmission rate corresponding to the mother code and channel information regarding the receiving terminal. In addition, the BER lower bound is determined based on the transmission rate and channel information regarding the third terminal.

Specifically, the data transmitting terminal determines that transmission of the data is successful in the case where the BER upper bound is smaller than the BER reference level for the receiving terminal and the probability of the BER lower bound to be smaller than the BER reference level for the third terminal is smaller than the predetermined value, or where the ACK/NACK message is an ACK message and the probability of the BER lower bound to be smaller than the BER reference level for the third terminal is smaller than the predetermined value.

In addition, the data transmitting terminal determines that transmission of the data is not successful and stops the transmission in the case where the BER upper bound is greater than the BER reference level for the receiving terminal and the probability of the BER lower bound to be smaller than the BER reference level for the third terminal is greater than the predetermined value, or where the ACK/NACK message is a NACK message and the probability of the BER lower bound to be smaller than the BER reference level for the third terminal is greater than the predetermined value.

Furthermore, the data transmitting terminal retransmits the data in the case where the BER upper bound is greater than the BER reference level for the receiving terminal and the probability of the BER lower bound to be smaller than the BER reference level for the third terminal is smaller than the predetermined value, or where the ACK/NACK message is a NACK message and the probability of the BER lower bound to be smaller than the BER reference level for the third terminal is smaller than the predetermined value.

HARQ Transmission Method 6:

Use HARQ transmission method 5 in a manner of transmitting data only when the current channel block satisfies the following condition, and, if not, waiting until the following condition is satisfied.

$$|h_{b,l}| \geq h_b^{Th}, \ l=1,2,\ldots \quad \text{[Equation 80]}$$

3. A Method for Transmitting Security Data Using a MDS Code on a Block Erasure Channel 3.1 Analysis of an error probability on a block erasure channel Consider code C of which length is n-NL ad alphabet size is a q-ary ($2^Q$-ary).

Each code word is represented as below:

$$x = (x_1, \ldots, x_l, \ldots, x_L) \quad \text{[Equation 81]}$$

$$= ((x_{1,1}, \ldots, x_{1,N}), \ldots,$$

$$(x_{l,1}, \ldots, x_{l,i}, \ldots, x_{l,N}), \ldots, (x_{L,1}, \ldots, x_{L,N}))$$

But $x_{l,i} \in X = \{a_1, \ldots, a_{2^Q}\}$, $x_l \in X^N$, and $x \in X^n$.

If the number of code words in this code is M (|C|=M), a transmission rate is given as below:

$$R = \frac{\log_2 M}{n} \text{ bits/channel use} \quad \text{[Equation 82]}$$

If a linear block code [n, k, d] is considered in GF(q), $M=q^k$ and thus a transmission rate may be represented as below:

$$R = \frac{k \log_2 q}{n} \text{ bits/channel use} \quad \text{[Equation 83]}$$
$$= \frac{kQ}{n} \text{ bits/channel use}$$

In the case of a binary linear block code, q=2(Q=1) and thus a transmission rate is given as $$R = \frac{k}{n}.$$

In this chapter, consider a block q-ary erasure channel. On this channel, all data (that is, N symbols) transmitted to the l-th channel block is erasured with probability $\epsilon_l$ or is received without any error with probability $1-\epsilon_l$.

As a single code word is transmitted for L channel blocks, the block q-ary erasure channel can be defined by an 'erasure probability vector', as below:

$$\epsilon_{1:L} = (\epsilon_1, \epsilon_2, \ldots, \epsilon_L) \quad \text{[Equation 84]}$$

Then, an 'erasure vector' actually generated by $\epsilon_{1:L}$ is defined as below:

$$e_{1:L}(\epsilon_{1:L}) = (e_1, \ldots, e_L) \in \{0,1\}^L \quad \text{[Equation 85]}$$

In the case of $e_l=1$, all data (that is, N symbols) in the channel block are erasured. Alternatively, in the case of $e_l=0$, all data in the channel block are received without any error.

In addition, $\bar{e}_l$ is used to indicate binary complement of $e_l$. In conclusion, the following relationship is valid:

$$Pr(e_l=1)=Pr(\bar{e}_l=0)=\epsilon_l \text{ and } Pr(e_l=0)=Pr(\bar{e}_l=1)=1-\epsilon_l \quad \text{[Equation 86]}$$

In the case where x denotes a transmission data vector and $\hat{x}$ denotes a data vector to be decoded, a block decoding error probability is given as below:

$$P_{err} = \frac{1}{|C|} \sum_{\hat{x} \neq x} Pr(\hat{x} \neq x) \quad \text{[Equation 87]}$$

For analysis of a block error probability, suppose that a code word $x=(0, \ldots, 0)$ is transmitted.

In this case, as disclosed in "A. G. i Fabregas, "Coding in the block-erasure channel," IEEE Trans. Inf. Theory, vol. 52, pp. 5116-5121, November 2006.", a group of code words is defined as below:

$$C(e_{1:L}(\epsilon_{1:L})) = \{x \in C \text{ if } e_l=0, \text{ then } x_l=(0,\ldots,0), \text{ for all } l=1,\ldots,L\} \quad \text{[Equation 88]}$$

The code words belonging to the group $C(e_{1:L}(\epsilon_{1:L}))$ are code words in which only data corresponding to an erasured block does not have 0, but have a different value.

By using this group when $e_{1:L}(\epsilon_{1:L})$ is given, a block error probability may be calculated as below:

$$P_{err}(e_{1:L}(\epsilon_{1:L})) = 1 - \frac{1}{|C(e_{1:L}(\epsilon_{1:L}))|} = 1 - \frac{1}{2^{NQW(e_{1:L}(\epsilon_{1:L}))}} \quad \text{[Equation 89]}$$

But, W(·) denotes a hamming weight for a given vector.

Then, by considering error correction effects which is led due to coding, an average block error probability is calculated. As a usual case, $[\tilde{n}, \tilde{k}, d_{min}]$ is considered in $GF(q=2^{QN})$.

That is, a group of N transmission symbols in a single channel block, each symbol which has alphabet size of $2^Q$, corresponds to one symbol in $GF(q=2^{QN})$.

The minimum hamming distance dmin is defined in $GF(q=2^{QN})$.

If $W(e_{1:L}(\epsilon_{1:L})) < d_{min}$ in this coding, any error is corrected and data is decoded without any error.

However, if $W(e_{1:L}(\epsilon_{1:L})) \geq d_{min}$, a decoding error occurs.

In conclusion, if $[\tilde{n}, \tilde{k}, d_{min}]$ code is used, an average block error probability is given as below:

$$P_{err}(\epsilon_{1:L}, d_{min}) = \mathbb{E}\left[1 - \frac{1}{2^{NQW(e_{1:L}(\epsilon_{1:L}))}}\right] \quad \text{[Equation 90]}$$
$$= \sum_{w=d_{min}}^{L} \left(1 - \frac{1}{2^{wQN}}\right) Pr(W(e_{1:L}(\epsilon_{1:L})) = w)$$

3.2 Data Transmission Using a MDS Code on a Block Erasure Channel

The present invention uses a Maximal Distance Separable (MDS) code.

Various primary properties of an MDS code are provided including quotations from "F. J. MacWilliams and N. J. A. Sloane, The theory of error-correcting codes, North Holland, 1988."

In addition, HARQ using an MDS code is described including quotations from "D. M. Mandelbaum, "An adaptive-feedback coding scheme using incremental redundancy," IEEE Trans. Inf. Theory, vol. 20, pp. 388 389, May 1974."

However, the aforementioned documents do not cope with a data transmission security issue and consider a block fading channel.

By contrast, the present invention proposes a secure HARQ method that provides data transmission security on a block erasure channel.

To this end, the following coding scheme is described in detail.

As described above, an actual physical channel is a block erasure channel having $2^Q$ inputs, and N symbols are transmitted for each channel block. Then, channels of Bob and Eve are defined.

A channel of Bob is a block erasure channel in which the l-th block data is completely erasured with probability $\epsilon_l^b$ or is received without any error with probability $1-\epsilon_l^b$, $l=1, 2, \ldots$.

A channel of Eve is a block erasure channel that is defined in the similar way using probability $\epsilon_l^e$.

In conclusion, block erasure channel of Bob and Eve are defined by two erasure probability vectors, as below:

$$\epsilon_{1:L}^b = (\epsilon_1^b, \epsilon_2^b, \ldots, \epsilon_L^b) \quad \text{[Equation 91]}$$

$$\epsilon_{1:L}^e = (\epsilon_1^e, \epsilon_2^e, \ldots, \epsilon_L^e) \quad \text{[Equation 92]}$$

Figure 5:
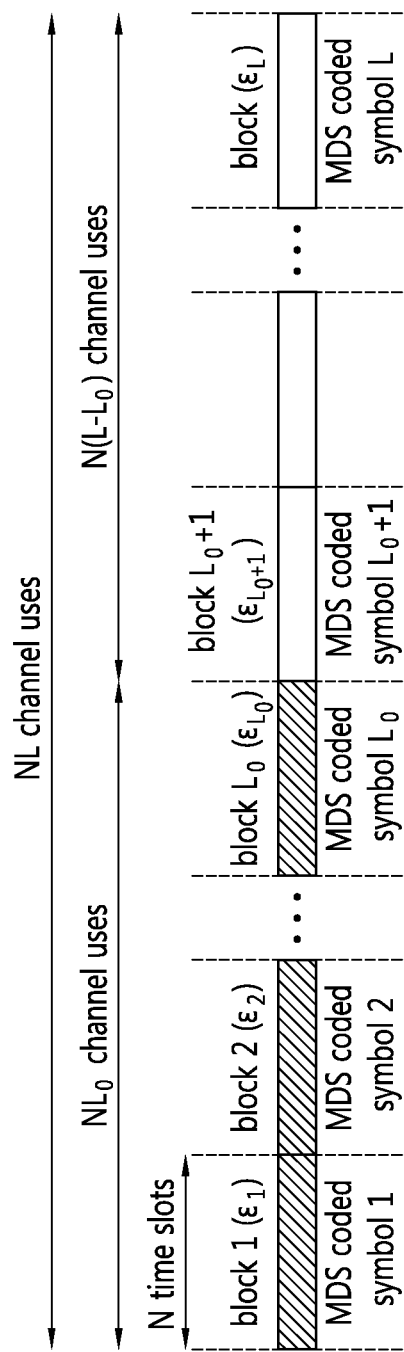
FIG. 5 is an example of a coding scheme which uses a Maximal Distance Separable (MDS) code in a block erasure channel.

FIG. 5 illustrates an example of a coding scheme which uses an MDS code on a block erasure channel.

Referring to FIG. 5, by grouping N symbols in an actual block erasure channel having $2^Q$ inputs and converting the group of N symbols into a single symbol, an erasure channel having $2^{QN}$ inputs (which is no longer a block erasure channel) is mathematically considered.

This erasure channel is a $2^{QN}$-ary erasure channel, and a transmission symbol defined in $GF(2^{QN})$ is erased with probability $\epsilon_i^b$ in the case of Bob and is erased with probability $\epsilon_i^e$ in the case of Eve.

A hamming distance of an MDS code has the maximum value to satisfy Singleton bound, and thus, it can be represented as $[L, L_0, L-L_0+1]$ in $GF(q=2^{QN})$.

In the case of an MDS code, a code length L is limited. In general, if a code length is limited, it is possible to design a code having a discrete transmission rate, as below:

$$L \leq q+1 = 2^{QN}+1 \quad \text{[Equation 93]}$$

In conclusion, the number of code words in a given MDS code is $M=q^k=q^{LC}=(2^{QN})^{L_0}$, and thus, a transmission rate is given as below:

$$R_L = \frac{\log_2 M}{n} \quad \text{[Equation 94]}$$
$$= \frac{L_0 \log_2 q}{LN}$$
$$= \frac{L_0}{L} Q \quad \text{(bits/channel use)}.$$

3.3 Secure HARQ Using a MDS Code on a Block Erasure Channel 3.3.1 When Channel Information of Bob and Eve is Known by Alice Consider a case where channel erasure probability vectors $\epsilon_{1:L_i}^b$ and $\epsilon_{1:L_i}^e$ of Bob and Eve, respectively, are known by Alice.

HARQ Transmission Method 7:

(Step 1): Configure a Mother Code

The mother code uses MDS code $[L, L_0, L-L_0+1]$ defined in $GF(q=2^{QN})$.

Herein, a code length L needs to be sufficiently greater than $L_0$, so that minimum hamming distance of $L-L_0+1$ has a sufficiently great value.

In this case, the transmission rate of the mother code, $$R_L = \frac{L_0}{L} Q$$

is sufficiently low value.

(Step 2): The First Transmission

At the first transmission, select a code words corresponding to a transmission message and then transmit the first $L_1 = L_0 + t_1$ MDS symbol of the code word. But, $t_1 = 0, 1, \ldots, L-L_0$.

Thus, the transmission rate $R_{L_1}$ of the first transmission is given as below:

$$R_{L_1} = \frac{L_0}{L_1} Q \quad \text{(bits/channel use)} \quad \text{[Equation 95]}$$

The MDS code transmitted as above is a punctured MDS code. The MDS code which is punctured is still a MDS code.

That is, this code is $[L_1, L_0, L_1-L_0+1]$.

Proceed with (Step 4)

(Step 3): The i-th Transmission ($i \geq 2$)

In the i-th transmission, transmit $t_i$ MDS symbols. But, $t_i = 1, \ldots, L-L_{i-1}$.

In conclusion, after the i-th transmission is completed, the transmission rate $R_{L_i}$ is given as below:

$$R_{L_i} = \frac{L_0}{L_i} Q \quad \text{(bits/channel use)} \quad \text{[Equation 96]}$$

But, $$L_i = L_{i-1} + t_i \quad \text{[Equation 97]}$$

From the beginning, a code for the i-th transmission may be considered an MDS code $[L_i, L_0, L_i-L_0+1]$.

Proceed with (Step 4)

(Step 4): Determine Whether to Retransmit Data

After the i-th transmission is completed ($i \geq 1$), a block decoding error probability is calculated for Bob and Eve, as below:

$$P_{err}^b(\varepsilon_{1:L_i}^b, d_{min,i}) = \quad \text{[Equation 98]}$$
$$\sum_{w=d_{min,i}}^{L_i} \left(1 - \frac{1}{2^{wQN}}\right) Pr(W(e_{1:L_i}(\varepsilon_{1:L_i}^b)) = w)$$

$$P_{err}^e(\varepsilon_{1:L_i}^e, d_{min,i}) = \quad \text{[Equation 99]}$$
$$\sum_{w=d_{min,i}}^{L_i} \left(1 - \frac{1}{2^{wQN}}\right) Pr(W(e_{1:L_i}(\varepsilon_{1:L_i}^e)) = w)$$

But, $$d_{min,i} = L_i - L_0 + 1 \quad \text{[Equation 100]}$$

From the above block error probability, a BER upper bound for Bob and a BER lower bound for Eve are obtained as below:

$$P_{BER}^{U,b}(\epsilon_{1:L_i}^b, d_{min,i}) = 0.5 P_{BER}^{U,b}(\epsilon_{1:L_1}^b, d_{min,i}) \quad \text{[Equation 101]}$$

$$P_{BER}^{U,b}(\epsilon_{1:L_i}^b, d_{min,i}) = P_{BER}^{SPN,L}(r,K) P_{BER}^{L,e}(\epsilon_{1:L_x}^e, d_{min,i}) \quad \text{[Equation 102]}$$

Then, one of the following three determinations is made.

i) If the following condition is satisfied, stop transmission and declare that the transmission is successful:

$$P_{BER}^{U,b}(\epsilon_{1:L_i}^b, d_{min,i}) \leq P_{BER}^{b,Th} \text{ and } P_{BER}^{L,e}((\epsilon_{1:L_i}, d_{min,i}) \geq P_{BER}^{e,Th} \quad \text{[Equation 103]}$$

ii) If the following condition is not satisfied, stop transmission and declare that the transmission is not successful:

$$P_{BER}^{U,b}(\epsilon_{1:L_i}^b, d_{min,i}) > P_{BER}^{b,Th} \text{ and } P_{BER}^{L,e}(\epsilon_{1:L_i}^e, d_{min,i}) < P_{BER}^{e,Th} \quad \text{[Equation 104]}$$

iii) If the following condition is satisfied, proceed with (Step 3):

$$P_{BER}^{U,b}(\epsilon_{1:L_i}^b, d_{min,i}) > P_{BER}^{b,Th} \text{ and } P_{BER}^{L,e}(\epsilon_{1:L_i}^r, d_{min,i}) > P_{BER}^{e,Th} \quad \text{[Equation 105]}$$

The above algorithm enables data transmission regardless of a statue of a channel.

If Bob's channel is not good enough compared with Eve's channel, successful data transmission cannot be achieved easily.

To solve this problem, data may be transmitted only when Bob's channel is good by a specific standard while Eve's channel is bad by a specific standard.

HARQ Transmission Method 8:

Use HARQ transmission method 7 in a manner of transmitting data only when the current channel block satisfies the following condition, and, if not, waiting until the following condition is satisfied.

$$\epsilon_i^b \leq \epsilon_{Th}^b \text{ and } \epsilon_i^e \geq \epsilon_{Th}^e \quad \text{[Equation 106]}$$

3.3.2 When Channel Information of Eve is known by Alice and There is a Feedback Channel for ACK From Bob In the case where there is a feedback channel for ACK from Bob, if Bob is able to perform decoding successfully, transmit ACK=1 to Alice, and, if not, transmit ACK=0 to Alice.

HARQ Transmission Method 9:

In the case where there is a feedback channel for ACK from Bob, (Step 4) in HARQ transmission method 7 is changed as below:

If the following condition is satisfied, stop transmission and declare that the transmission is successful:

$$\text{ACK}=1 \text{ and } P_{BER}^{L,e}(\epsilon_{1:L_i}^e, d_{min,i}) \geq P_{BER}^{e,Th} \quad \text{[Equation 107]}$$

If the following condition is not satisfied, stop transmission and declare that the transmission is not successful:

$$\text{ACK}=0 \text{ and } P_{BER}^{L,e}(\epsilon_{1:L_i}^e, d_{min,i}) < P_{BER}^{e,Th} \quad \text{[Equation 108]}$$

If the following condition is satisfied, proceed with (Step 3):

$$\text{ACK}=0 \text{ and } P_{BER}^{L,e}(\epsilon_{1:L_i}^e, d_{min,i}) > P_{BER}^{e,Th} \quad \text{[Equation 109]}$$

Similarly to HARQ transmission method 8, data may be transmitted only when Bob's channel is good by a specific standard, while Eve's channel bad by specific standard.

HARQ Transmission Method 10:

Use HARQ transmission method 9 in a manner of transmitting data only when the current channel block satisfies the following condition, and, if not, waiting until the following condition is satisfied.

$$\epsilon_i^b \leq \epsilon_{Th}^b \text{ and } \epsilon_i^e \geq \epsilon_{Th}^e \quad \text{[Equation 110]}$$

3.3.3 When Channel Information of Eve is Not Known by Alice

Consider a case where channel erasure probability vector z of Bob is known by Alice, while channel erasure probability vector of Eve is not known by Alice.

In this case, a block error probability of Eve becomes a probability variable.

That is, $\Pr(W(e_{1:L_i}(\epsilon_{1:L_i}^e))=w)$ becomes a probability variable, and thus, block error probability $P_{err}^e(\epsilon_{1:L_i}^e, d_{min,i})$ becomes a probability variable.

Generally, it is very difficult to obtain an accurate probability distribution of the probability variable.

The present invention uses central limit theorem to obtain an approximate probability distribution.

First, average $\mu_i$ and variance $\delta_i^2$ of probability variable) $P_{err}^e(\epsilon_{1:L}^e, d_{min,i})$ are obtained as below:

$$\mu_i = \sum_{\epsilon_{1:L_i}^e \in W^e} P_{err}^e(\epsilon_{1:L_i}^e, d_{min,i}) \Pr(\epsilon_{1:L_i}^e) \quad \text{[Equation 111]}$$

-continued $$\delta_i^2 = \sum_{\epsilon_{1:L_i}^e \in W^e} \left(P_{err}^e(\epsilon_{1:L_i}^e, d_{min,i})\right)^2 \Pr(\epsilon_{1:L_i}^e) - \mu_i^2 \quad \text{[Equation 112]}$$

Then, by using central limit thereof, $P_{err}^e(\epsilon_{1:L_i}^e, d_{min,i})$ is approximated using Gaussian distribution, as below:

$$P_{err}^e(\epsilon_{1:L_i}^e, d_{min,i}) \sim N(\mu_i, \delta_i^e) \quad \text{[Equation 113]}$$

HARQ Transmission Method 11:

In the case where channel information of Eve is not known by Alice, (Step 4) in HARQ transmission method 7 or HARQ transmission method 9 is converted as below:

If the following condition is satisfied, stop transmission and declare that the transmission is successful:

$$P_{BER}^{U,b}(\epsilon_{1:L_i}^b, d_{min,i}) \leq P_{BER}^{b,Th} \text{ and } P_{BER}(\epsilon_{1:L_i}, d_{min,i}) < P_{BER}^{e,Th}) \leq \delta \quad \text{[Equation 114]}$$

Or, $$\text{ACK}=1 \text{ and } \Pr(P_{BER}^{L,e}(\epsilon_{1:L_i}^e, d_{min,i}) < P_{BER}^{e,Th}) \leq \delta \quad \text{[Equation 115]}$$

If the following condition is not satisfied, stop transmission and declare that the transmission is not successful:

$$P_{BER}^{U,b}(\epsilon_{1:L_i}^b, d_{min,i}) > P_{BER}^{b,Th} \text{ and } \Pr(P_{BER}^{L,e}(\epsilon_{1:L_i}^e, d_{min,i}) < P_{BER}^{e,Th}) > \delta \quad \text{[Equation 116]}$$

Or, $$\text{ACK}=0 \text{ and } \Pr(P_{BER}^{L,e}(\epsilon_{1:L_i}^e, d_{min,i}) < P_{BER}^{e,Th}) > \delta \quad \text{[Equation 117]}$$

If the following condition is satisfied, proceed with (Step 3):

$$P_{BER}^{U,b}(\epsilon_{1:L_i}^b, d_{min,i}) > P_{BER}^{b,Th} \text{ and } \Pr(P_{BER}^{L,e}(\epsilon_{1:L_i}^e, d_{min,i}) < P_{BER}^{e,Th}) \leq \delta \quad \text{[Equation 118]}$$

Or, $$\text{ACK}=0 \text{ and } \Pr(P_{BER}^{L,e}(\epsilon_{1:L_i}^e, d_{min,i}) < P_{BER}^{e,Th}) \leq \delta \quad \text{[Equation 119]}$$

HARQ Transmission Method 12:

Use HARQ transmission method 11 in a manner of transmitting data only when the current channel block satisfies the following condition, and, if not, waiting until the following condition is satisfied.

$$\epsilon_i^b \leq \epsilon_{Th}^b$$

3.3.4 Interleaving

Figure 6:
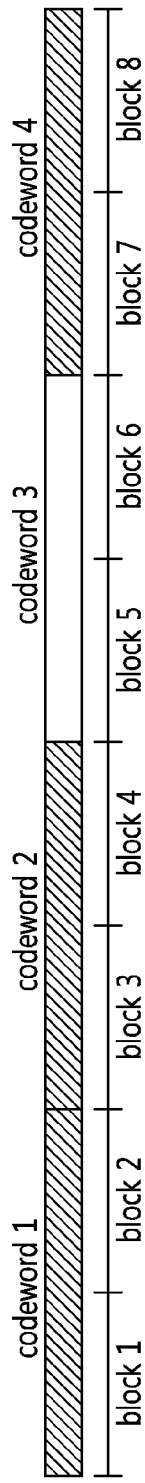
FIG. 6 is an example of a method for increasing the minimum hamming distance by implementing interleaving in the case where an MDS code is used in a block fading channel.
Figure 6:
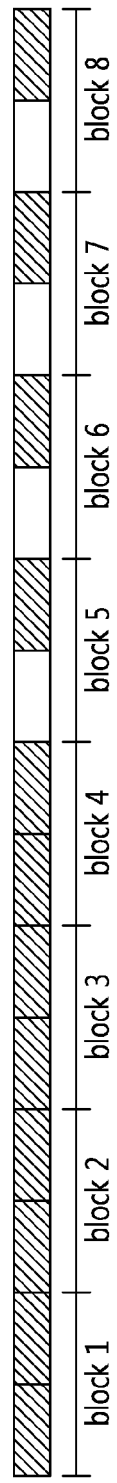
Figure 6:
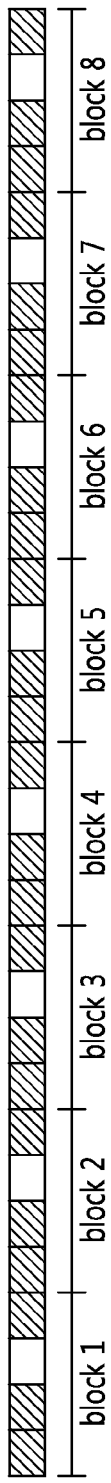

FIG. 6 is an example of a method for increasing the minimum hamming distance by implementing interleaving in the case where an MDS code is used on a block fading channel.

If n=NL (in channel uses), which is a length of a code to be transmitted, is given, the minimum hamming distance of a MDS code to be transmitted may be increased by implementing interleaving.

First, group z is defined as below:

$$\mathcal{Z} = \left\{ z : \mathcal{R}\left(\frac{N}{z}\right) = 0, z = 1, 2, \ldots, N \right\} \quad \text{[Equation 121]}$$

But, $$\mathcal{R}\left(\frac{a}{b}\right)$$

denotes the rest of $$\frac{a}{b}.$$

Now, it is possible to perform interleaving of depth corresponding to values belonging to Z.

In this case, an MDS code is converted as below:

$$[L, L_0, L - L_0 + 1] \text{ over} \quad \text{[Equation 122]}$$
$$GF(2^{NQ}) \Rightarrow [zL_1, zL_0, zL - zL_0 + 1] \text{ over}$$
$$GF\left(2^{\frac{N}{z}Q}\right)$$

But, in the case of $z \in \mathcal{Z}$ ., the minimum hamming distance increases as below:

$$d_{min} = L - L_0 + 1 \Rightarrow d_{min} = zL - zL_0 + 1 \quad \text{[Equation 123]}$$

If L and $L_0$ are great enough, the hamming distance increases by approximately z times.

Regarding an MDS code $[\tilde{n}, \tilde{k}, \tilde{n}-\tilde{k}+1]$ defined in $GF(\tilde{q})$, a code length is limited as below ($\tilde{n}=\tilde{q}+2$ is possible only for few specific transmission rates):

$$\tilde{n} \leq \tilde{q}+1. \quad \text{[Equation 124]}$$

Thus, for a MDS code $[zL, zL_0, zL-zL_0+1]$ defined in $$GF\left(2^{\frac{N}{z}Q}\right),$$

the following condition needs to be satisfied:

$$zL \leq 2^{\frac{N}{z}Q} + 1 \quad \text{[Equation 125]}$$

In conclusion, the maximum interleaving depth $Z_{max}$ is given as below:

$$z_{max} = \max_{z \in \mathcal{Z}} z \text{ subject to } zL \leq 2^{\frac{N}{z}Q} + 1 \quad \text{[Equation 126]}$$

The embodiments of the present invention described above may be implemented through a variety of means. For example, the embodiments of the present invention may be implemented by hardware, a firmware, software or a combination thereof.

Figure 7:
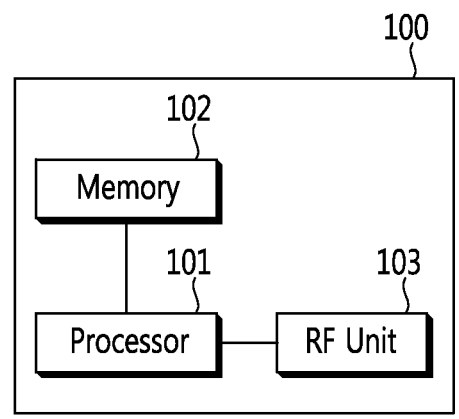
FIG. 7 is a block diagram showing a wireless communication system to implement an embodiment of the present invention.

FIG. 7 is a block diagram showing a wireless communication system to implement an embodiment of the present invention.

A terminal 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the terminal may be implemented by the processor 101.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing Hybrid Automatic Repeat Request (HARQ) by a first terminal in a wireless communication system, the method comprising:
   transmitting data using a specific code word selected from a plurality of code words included in a mother code;
   calculating a Bit Error Rate (BER) upper bound for a second terminal that receives the data;
   calculating a BER lower bound for a third terminal that is able to eavesdrop the data; and
   performing the HARQ based on whether the BER upper bound is greater than a BER reference level for the second terminal and whether a probability of the BER lower bound being less than the calculated BER reference level is less than a predetermined value,
   wherein the BER upper bound is determined based on a transmission rate corresponding to the mother code and channel information corresponding to the second terminal, and
   wherein the BER lower bound is determined based on the transmission rate and channel information corresponding to the third terminal.

2. The method of claim 1, wherein performing the HARQ comprises determining that transmission of the data is successful when the BER upper bound is less than the BER reference level for the second terminal and the probability is less than the predetermined value.

3. The method of claim 1, wherein performing the HARQ comprises determining that transmission of the data is not successful when the BER upper bound is greater than the BER reference level for the second terminal and the probability is greater than the predetermined value.

4. The method of claim 1, wherein performing the HARQ comprises retransmitting the data when the BER upper bound is greater than the BER reference level for the second terminal and the probability is less than the predetermined value.

5. A method for performing Hybrid Automatic Repeat Request (HARQ) by a first terminal in a wireless communication system, the method comprising:
   transmitting data using a specific code word from a plurality of code words included in a mother code;

receiving a positive-acknowledgement (ACK)/negative-acknowledgement (NACK) message from a second terminal that receives the data;

calculating a Bit Error Rate (BER) lower bound for a third terminal that is able to eavesdrop the data; and performing the HARQ based on whether the ACK/NACK message is an ACK message or an NACK message and whether a probability of the BER lower bound being less than the calculated BER reference level is less than a predetermined value, wherein the BER lower bound is determined based on a transmission rate corresponding to the mother code and channel information corresponding to the third terminal.

6. The method of claim 5, wherein performing the HARQ comprises determining that transmission of the data is successful when the ACK/NACK message is an ACK message and the probability is less than the predetermined value.

7. The method of claim 5, wherein the performing the HARQ comprises determining that transmission of the data is not successful and stopping the transmission when the ACK/NACK message is a NACK message and the probability is greater than the predetermined value.

8. The method of claim 5, wherein performing the HARQ comprises retransmitting the data when the ACK/NACK message is a NACK message and the probability is less than the predetermined value.

9. A first terminal for performing Hybrid Automatic Repeat Request (HARQ) in a wireless communication system, the first terminal comprising:

an RF (Radio Frequency) unit configured to transmit data using a specific code word selected from a plurality of code words included in a mother code; and a processor configured to:
calculate a Bit Error Rate (BER) upper bound for a second terminal that receives the data;
calculate a BER lower bound for a third terminal that is able to eavesdrop the data; and
perform Hybrid Automatic Repeat Request (HARQ) based on at least whether a received positive-acknowledgement (ACK)/negative-acknowledgement (NACK) message is an ACK message or a NACK message, whether the BER upper bound is less than a BER reference level for the second terminal, or whether a probability of the BER lower bound being less than a BER reference level for the third terminal is less than a predetermined value, wherein the BER upper bound is determined based on a transmission rate corresponding to the mother code and channel information corresponding to the second terminal, and wherein the BER lower bound is determined based on the transmission rate and channel information corresponding to the third terminal.

10. The terminal of claim 9, wherein the processor is further configured to determine that transmission of the data is successful when either the BER upper bound is less than the BER reference level for the second terminal and the probability is less than the predetermined value or the ACK/NACK message is an ACK message and the probability is less than the predetermined value.

11. The terminal of claim 9, wherein the processor is further configured to determine that transmission of the data is not successful and stop the transmission when either the BER upper bound is greater than the BER reference level for the second terminal and the probability is greater than the predetermined value or the ACK/NACK message is a NACK message and the probability is greater than the predetermined value.

12. The terminal of claim 9, wherein the processor is further configured to retransmit the data when either the BER upper bound is greater than the BER reference level for the second terminal and the probability is less than the predetermined value or the ACK/NACK message is a NACK message and the probability is less than the predetermined value.

* * * * *